(12) United States Patent
Kezys et al.

(10) Patent No.: US 8,750,263 B2
(45) Date of Patent: Jun. 10, 2014

(54) WLAN AND WWAN CONNECTION MIGRATION METHODS AND APPARATUS

(75) Inventors: Vytautas Robertas Kezys, Hamilton (CA); Terence D. Todd, Hamilton (CA)

(73) Assignees: BlackBerry Limited, Waterloo, Ontario (CA); McMaster University, Hamilton, Ontario (CA)

( * ) Notice: Subject to any disclaimer, the term of this patent is extended or adjusted under 35 U.S.C. 154(b) by 794 days.

(21) Appl. No.: 11/741,028

(22) Filed: Apr. 27, 2007

(65) Prior Publication Data

US 2007/0265003 A1 Nov. 15, 2007

Related U.S. Application Data

(60) Provisional application No. 60/795,962, filed on Apr. 28, 2006.

(51) Int. Cl.
*H04W 4/00* (2009.01)
*H04W 40/00* (2009.01)
*G06F 15/16* (2006.01)

(52) U.S. Cl.
USPC ............ 370/338; 370/328; 455/446; 709/227

(58) Field of Classification Search
USPC .................. 709/227; 455/435, 452, 420, 446; 370/338, 231, 328
See application file for complete search history.

(56) References Cited

U.S. PATENT DOCUMENTS

| | | | |
|---|---|---|---|
| 6,243,581 B1 | 6/2001 | Jawanda | |
| 6,393,261 B1 | 5/2002 | Lewis | |
| 6,909,899 B2 | 6/2005 | Wang et al. | |
| 7,009,952 B1 | 3/2006 | Razavilar et al. | |
| 7,466,991 B2 | 12/2008 | Everson et al. | |
| 7,561,547 B2 * | 7/2009 | Brideglall | ..................... 370/329 |
| 2002/0085516 A1 | 7/2002 | Bridgelall | |
| 2002/0136226 A1 | 9/2002 | Christoffel et al. | |
| 2002/0191575 A1 | 12/2002 | Kalavade et al. | |

(Continued)

FOREIGN PATENT DOCUMENTS

| | | |
|---|---|---|
| CA | 2398185 | 7/2007 |
| CN | 1751495 | 3/2006 |

(Continued)

OTHER PUBLICATIONS

Mary Narisetti, "Implementation of vertical handoff algorithm between IEEE802.11 WLAN and CDMA cellular network", Aug. 2006.

(Continued)

*Primary Examiner* — Nizar Sivji

(74) *Attorney, Agent, or Firm* — The Danamraj Law Group, P.C.

(57) ABSTRACT

Intra-enterprise wireless handset (WH) calls between WHs operating in a wireless local area network (WLAN) are established directly between the WHs via a call connection that is maintained within the LAN without being routed through the cellular network (CN). This eliminates the cost of placing and maintaining calls through the CN for intra-enterprise calls, and also enables use of capabilities that are available in the enterprise telecomm equipment. Upon detection of a trigger condition, if and when it is more likely that a complete vertical handover (VHO) may be needed, the call connection between the WHs in the LAN is replaced by one that is routed through the CN. Thereafter, a VHO may occur (if at all) upon detection of a radio handover condition.

30 Claims, 7 Drawing Sheets

(56) References Cited

U.S. PATENT DOCUMENTS

| | | | |
|---|---|---|---|
| 2003/0134650 | A1 | 7/2003 | Sundar et al. |
| 2004/0127208 | A1* | 7/2004 | Nair et al. ............... 455/420 |
| 2004/0170122 | A1* | 9/2004 | Guo et al. ............... 370/210 |
| 2004/0170191 | A1 | 9/2004 | Guo et al. |
| 2004/0199637 | A1* | 10/2004 | Li et al. ............... 709/227 |
| 2004/0259541 | A1 | 12/2004 | Hicks, III et al. |
| 2004/0266426 | A1 | 12/2004 | Marsh et al. |
| 2005/0020286 | A1 | 1/2005 | Lazaridis et al. |
| 2005/0058125 | A1 | 3/2005 | Mutikainen et al. |
| 2005/0059402 | A1 | 3/2005 | Jagadeesan et al. |
| 2005/0080884 | A1* | 4/2005 | Siorpaes et al. ............ 709/223 |
| 2005/0096024 | A1 | 5/2005 | Bicker et al. |
| 2005/0148353 | A1 | 7/2005 | Hicks, III et al. |
| 2005/0197156 | A1 | 9/2005 | Fourquin et al. |
| 2005/0286466 | A1 | 12/2005 | Tagg et al. |
| 2006/0126562 | A1 | 6/2006 | Liu |
| 2006/0166699 | A1* | 7/2006 | Aghvami et al. ......... 455/552.1 |
| 2006/0239277 | A1* | 10/2006 | Gallagher ............... 370/401 |
| 2006/0291419 | A1* | 12/2006 | McConnell et al. ......... 370/331 |

FOREIGN PATENT DOCUMENTS

| | | | |
|---|---|---|---|
| EP | 0700227 | A2 | 3/1996 |
| EP | 1263254 | A2 | 12/2002 |
| EP | 1596564 | A2 | 11/2005 |
| EP | 1480385 | A3 | 11/2008 |
| GB | 2288301 | A | 10/1995 |
| GB | 2422515 | | 5/2009 |
| JP | 2004517574 | | 6/2004 |
| WO | 0076145 | A1 | 12/2000 |
| WO | 0122764 | A1 | 3/2001 |
| WO | 02054820 | A2 | 7/2002 |
| WO | 2004012464 | A2 | 2/2004 |
| WO | 2004073282 | | 8/2004 |
| WO | 2004100452 | A1 | 11/2004 |
| WO | 2005029901 | A2 | 3/2005 |
| WO | 2005067334 | A1 | 7/2005 |
| WO | 2005104587 | A1 | 11/2005 |
| WO | 2005107312 | A1 | 11/2005 |
| WO | 2007033485 | A2 | 3/2007 |
| WO | 2007082368 | A1 | 7/2007 |

OTHER PUBLICATIONS

Extended European Search Report, EPO Application No. 07719639. 2, Mar. 25, 2009.
International Preliminary Report on Patentability—PCT/CA2007/000713, Jul. 16, 2008.
International Search Report # PCT/CA2007/00713 Dated: Jul. 23, 2007.
M Smadi, "Dynamically Anchored Conferencing Handoff for Dual-Mode Cellular/WLAN Handsets" IEEE International Conference on Communications—Dated: Oct. 2006, vol. 5, pp. 2028-2033.
M. Smadi, "A Measurement-Based Study of WLAN to Cellular Handover" IEEE International Conference on Mobile Adhoc and Sensor Systems—Dated: Jun. 2006, pp. 735-740.
European Examination Report for EP Application # 07719639.2, May 9, 2011.
Japanese Office Action for JP application # 2009506881, Jun. 20, 2011.
State Intellectual Property Office of the P.R. of China, "Notice of Allowance," issued in connection with Chinese Patent Application No. 200780024291.6, on Aug. 13, 2013, 4 pages.
IP Australia, "Examiners First Report," issued in Australian Application No. 2007246111, on Feb. 16, 2010 (3 pages).
IP Australia, "Notice of Acceptance," issued in Australian Application No. 2007246111, on Nov. 17, 2010 (3 pages).
Canadian Intellectual Property Office, "Exam Report," issued in Canadian Application No. 2,649,866, on Mar. 29, 2012 (3 pages).
Canadian Intellectual Property Office, "Exam Report," issued in Canadian Application No. 2,649,866, on Jan. 7, 2013 (2 pages).
State Intellectual Property Office of China, "First Office Action," issued in Chinese Patent Application No. 200780024291.6, on Sep. 21, 2011 (7 pages).
State Intellectual Property Office of China, "Second Office Action," issued in Chinese Patent Application No. 200780024291.6, on Aug. 1, 2012 (4 pages).
State Intellectual Property Office of China, "Third Office Action," issued in Chinese Patent Application No. 200780024291.6, on Apr. 28, 2013 (7 pages).
Japanese Patent Office, "Notice of Reasons for Rejection," issued in Japanese Patent Application No. 2009-506881, on Feb. 24, 2012 (7 pages).
Japanese Patent Office, "Notice of Allowance," issued in Japanese Patent Application No. 2009-506881, on Oct. 17, 2012 (3 pages).
Korean Intellectual Property Office, "Notice Requesting Submission of Opinion," issued in Korean Application No. 10-2008-7028046, on Feb. 25, 2011 (6 pages.).
Korean Intellectual Property Office, "Notice of Decision for Patent," ssued in Korean Application No. 10-2008-7028046, on Jul. 30, 2012 (3 pages.).
Patent Cooperation Treaty, "Written Opinion of the International Searching Authority," issued by the International Searching Authority in connection with PCT/CA2007/000713, on Jul. 23, 2007 (5 pages).
Canadian Intellectual Property Office, "Exam Report," issued in Canadian Application No. 2,649,866, on Nov. 15, 2013, 3 pages.

* cited by examiner

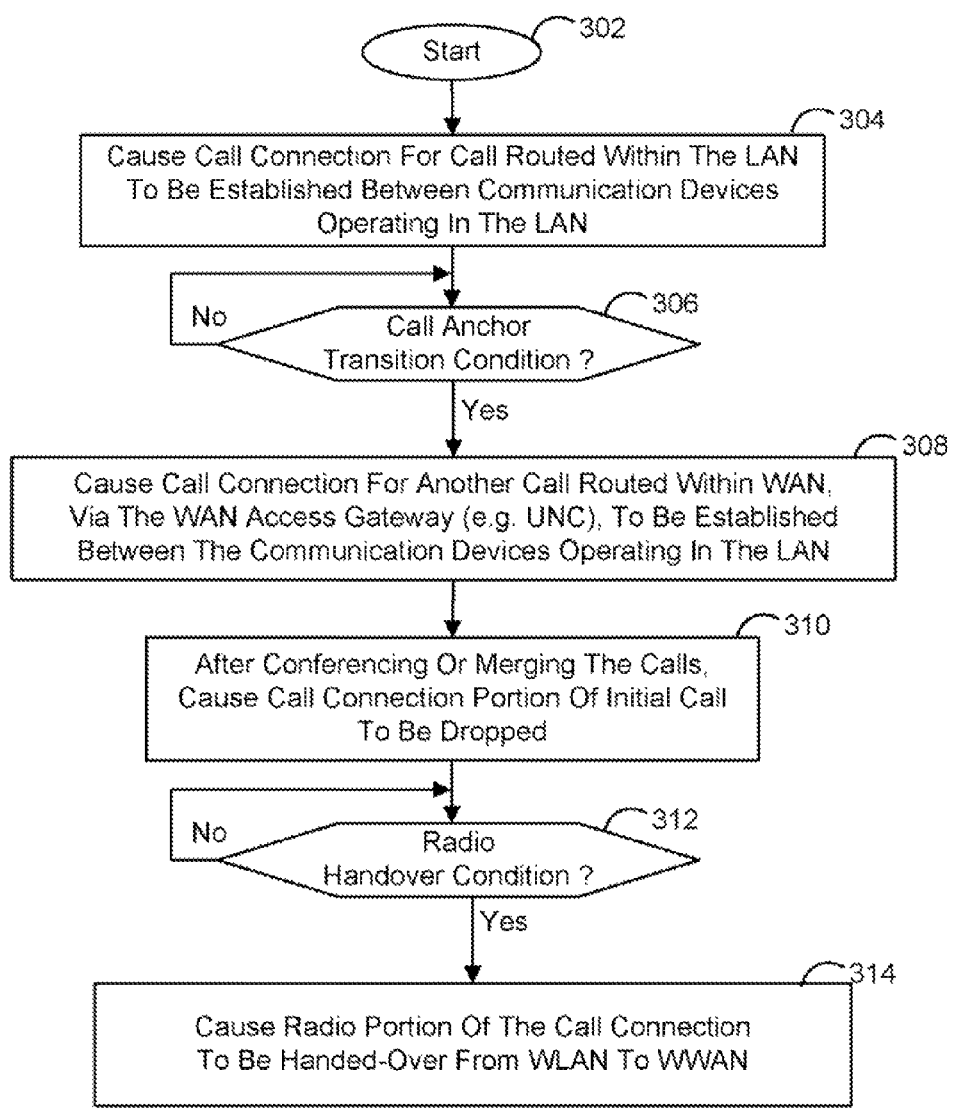

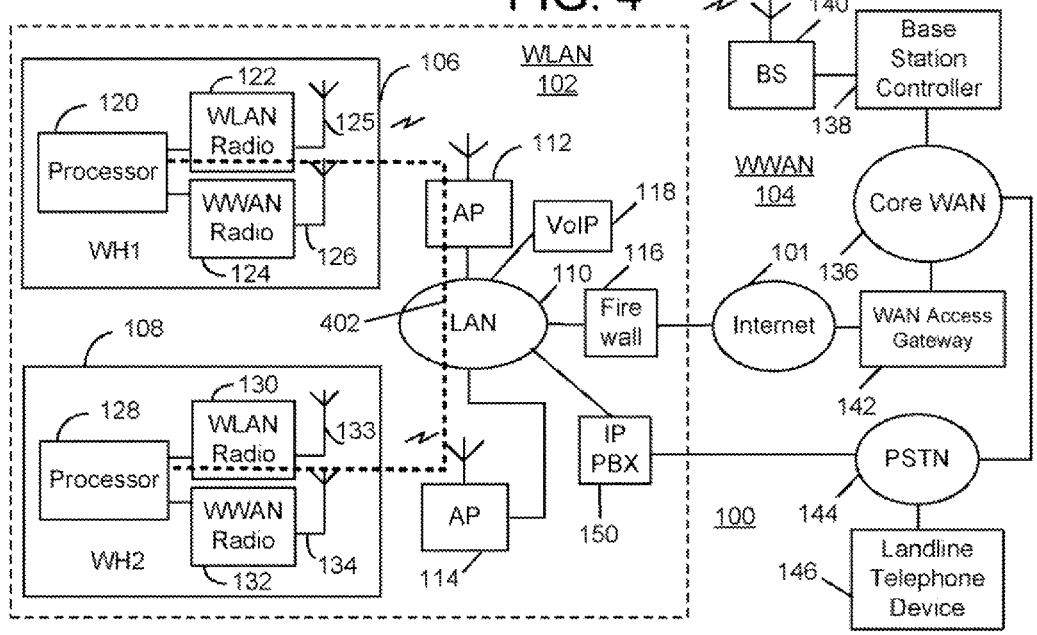
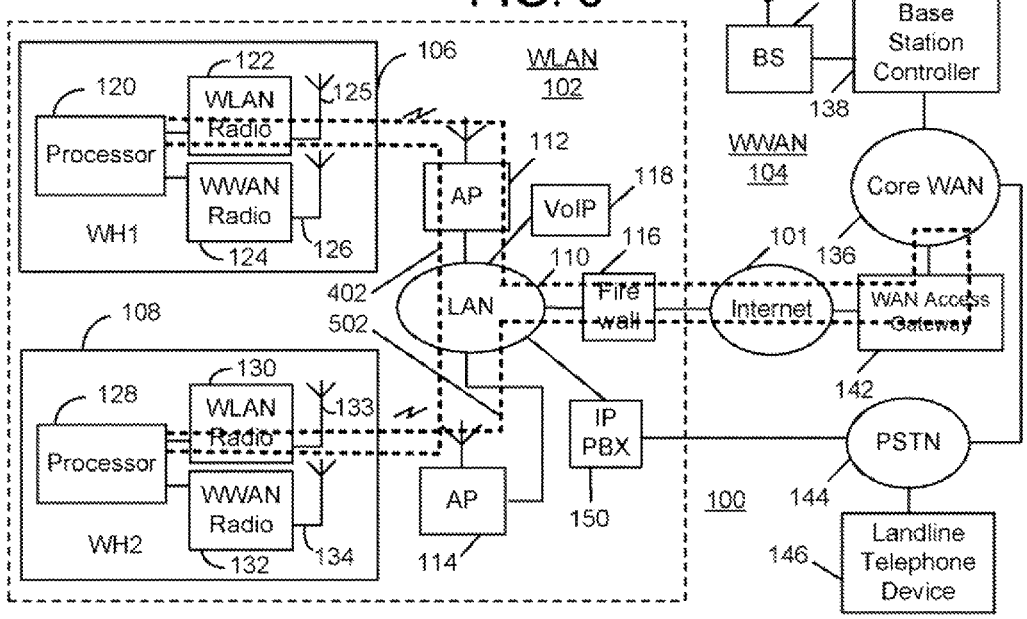

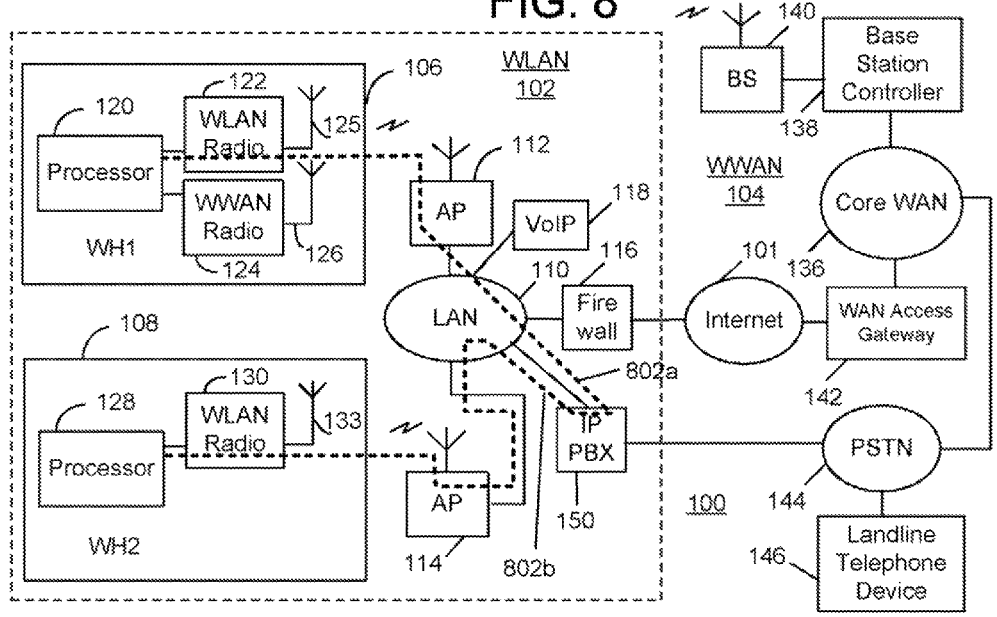
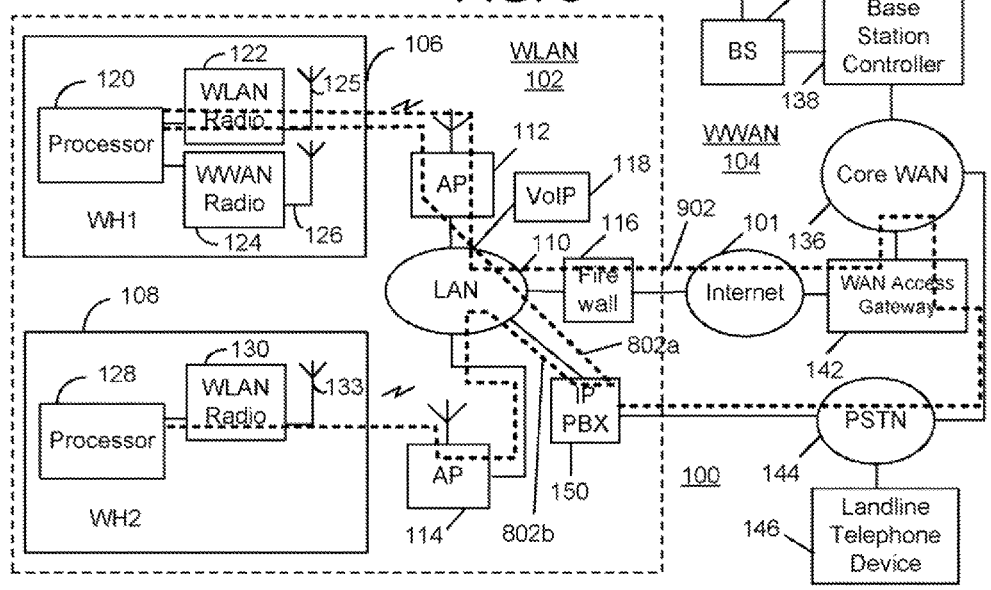

WLAN AND WWAN CONNECTION MIGRATION METHODS AND APPARATUS

CROSS-REFERENCE TO RELATED APPLICATION

This patent application claims priority to a U.S. Provisional Patent Application entitled "WLAN And WWAN Connection Migration Methods And Apparatus" having Application No. 60/795,962 and filing date of 28 Apr. 2006, which is hereby incorporated by reference herein.

BACKGROUND

1. Field of the Technology

The present disclosure relates generally to connection migration methods and apparatus between wireless local area networks (WLANs) and wireless wide area networks (WWANs) for communication devices such as mobile communication devices.

2. Description of the Related Art

The present disclosure relates generally to connection migration methods and apparatus between WLANs (e.g. IEEE 802.11 based networks) and WWANs (e.g. cellular telecommunication networks for communication devices such as mobile communication devices (e.g. wireless handsets or WHs). The specific problem addressed involves the support of real-time voice connections when multi-mode WHs are used in enterprise settings. Each WH has a WLAN radio interface and a cellular radio interface. When a voice connection is active through the WLAN interface and the WH roams out of WLAN coverage, the call is maintained by re-connecting it through the WH's cellular interface. The transition between these two interfaces and networks is referred to as a vertical handover (VHO). The switch between interfaces must be done subject to strict latency constraints, so that the voice connection quality is not adversely affected.

In order to enable VHO, the connection is normally split into two call "legs" which are anchored either in the cellular network (CN) or in the enterprise. The "anchor" is the point where the two call legs come together. When VHO occurs, one of these legs is replaced by a new call leg that is established through the wireless network (WLAN or cellular) to which the WH is handing-over. Enterprise anchoring (EA) is complex from a user's point of view since the handover must be anchored and managed by equipment inside the enterprise, such as a Public Switched Telephone Network (PSTN) gateway or IP Public Branch Exchange (PBX). Cellular network anchoring (CNA) pushes this complexity into the CN, which is more desirable from that point of view. CNA is often capable of much faster handovers since both WLAN and cellular call legs terminate inside the cellular operator's core network. The CNA model is typical of currently proposed carrier-based dual-mode device solutions such as IP Multimedia Subsystem (IMS) and Unlicensed Mobile Access (UMA). Enterprise anchoring normally incurs longer VHO execution delays than CNA because the new cellular call leg setup must propagate through the cellular core network, the PSTN, and the enterprise network.

Unfortunately, the user of CNA even requires that all intra-enterprise calls placed to/from WHs be routed through the CN when the call is made. This is required to establish the anchor needed in the event that a VHO occurs at some later time during the call. Thus, placing intra-enterprise calls is expected to be more costly since enterprise users will be billed by the cellular operator even for calls which remain internal to the enterprise. Enterprise customers who have invested in a telecom infrastructure and WLAN infrastructure that they manage may be reluctant to pay a carrier to use their own network. In addition, if all calls are forced to go through the CN, it will not be possible to fully utilize the enhanced capabilities that are available in the enterprise infrastructure.

Accordingly, there is a need for improved connection migration methods and apparatus to overcome the deficiencies of the prior art.

SUMMARY

According to the present disclosure, intra-enterprise wireless handset (WH) calls between WHs operating in a wireless local area network (WLAN) are established directly between the WHs via a call connection that is maintained within the LAN without being routed through the cellular network (CN). This eliminates the cost of placing and maintaining calls through the CN for intra-enterprise calls, and also enables use of capabilities that are available in the enterprise telecomm equipment. Upon detection of a trigger condition, if and when it is more likely that a complete vertical handover (VHO) may be needed, the call connection between the WHs in the LAN is replaced by one that is routed through the CN. Thereafter, the VHO may occur (if at all) upon detection of a radio handover condition.

BRIEF DESCRIPTION OF THE DRAWINGS

Embodiments of present invention will now be described by way of example with reference to attached figures, wherein:

FIG. 3 is a flowchart which describes a method of switching communication operations between WLANs and WWANs for calls such as voice calls (e.g. VoIP calls) between communication devices;

FIGS. 4-7 are illustrations of the communication system of FIG. 1 presented in a sequence according to the flowchart of FIG. 1, wherein in FIG. 4 a first state is represented where an initial call between communication devices connected in the LAN has a call connection that is routed through and not outside the LAN (i.e. not through the WAN);

FIG. 5 illustrates a second state of the communication system from previous FIG. 4, where a call anchor transition condition is detected which triggers a subsequent call to be established between the communication devices having a call connection that is routed through the WAN;

FIG. 6 illustrates a third state of the communication system from previous FIG. 5, where the subsequent call is conferenced or merged with the initial call and the initial call is dropped;

FIG. 7 illustrates a fourth state of the communication system from previous FIG. 6, where a radio handover condition is detected which triggers a radio handover of RF resources of the WLAN to RF resources of the WWAN for one of the communication devices;

FIGS. 8-11 are illustrations of the communication system of FIG. 1 presented in a sequence according to the flowchart of FIG. 1, in an alternate embodiment where one of the communication devices is a legacy device utilizing conventional operation, and where in FIG. 8 a first state is represented where an initial call between the communication devices connected in the LAN has a call connection that is routed through but not outside the LAN (i.e. not through the WAN) and via an IP PBX of the LAN;

FIG. 9 illustrates a second state of the communication system from the previous FIG. 8, where a call anchor transition condition is detected which triggers a subsequent call to be established between the communication device and the IP PBX for the legacy device with a call connection that is routed through the WAN;

FIG. 10 illustrates a third state of the communication system from the previous FIG. 9, where the subsequent call is conferenced or merged with a first connection portion of the initial call portion at the IP PBX and a second connection portion of the initial call is dropped; and FIG. 11 illustrates a fourth state of the communication system from the previous FIG. 10, where a radio handover condition is detected which triggers a radio handover of RF resources of the WLAN to RF resources of the WWAN for one of the communication devices.

DETAILED DESCRIPTION OF THE PREFERRED EMBODIMENTS

Figure 1:
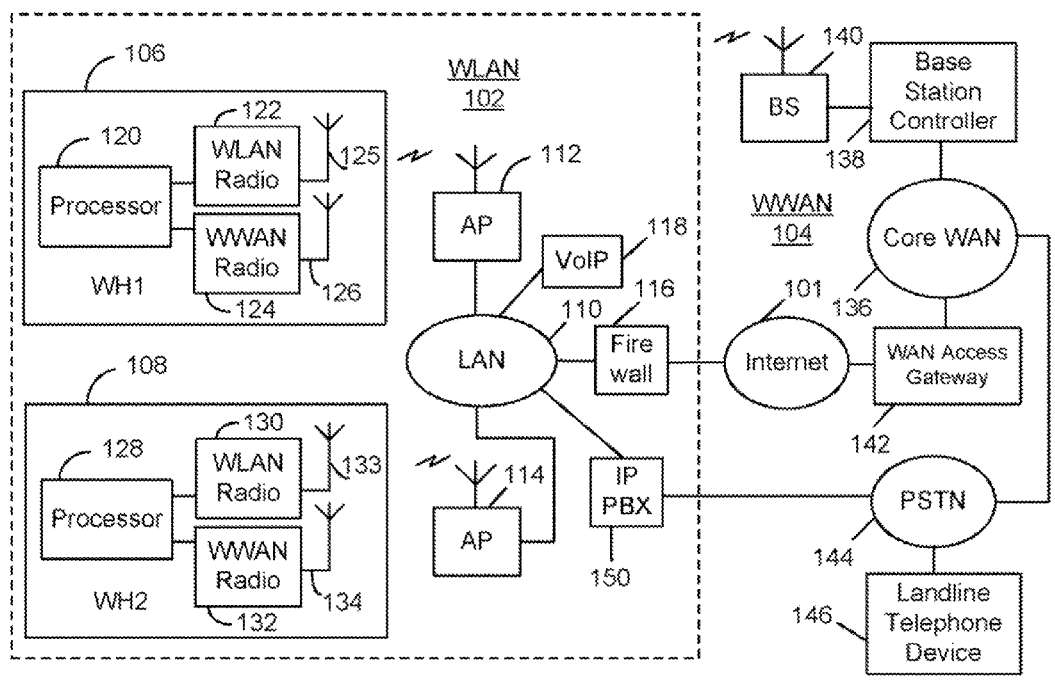
FIG. 1 is an illustrative representation of a communication system which includes a wireless local area network (WLAN) (such as an IEEE 802.11-based wireless network) of a LAN and a wireless wide area network (WWAN) (such as a cellular telecommunications network) of a WAN.

According to the present disclosure, intra-enterprise wireless handset (WH) calls between WHs operating in a wireless local area network (WLAN) are established directly between the WHs via a call connection that is maintained solely within the LAN without being routed through the cellular network (CN). This eliminates the cost of placing and maintaining calls through the CN for intra-enterprise calls, and also enables use of capabilities that are available in the enterprise telecomm equipment. Upon detection of a trigger condition, if and when it is more likely that a complete vertical handover (VHO) may be needed, the call connection between the WHs in the LAN is replaced by one that is routed through the CN. Thereafter, the VHO may occur (if at all) upon detection of a radio handover condition.

More specifically, two WHs (e.g. WH1 and WH2) are initially operating within enterprise WLAN coverage and each are associated with an IEEE 802.11 access point (AP). When an intra-enterprise call is made between WH1 and WH2, the call is established and maintained directly between the two WHs through the LAN. The call may be a Voice over IP (VoIP) call utilizing Session Initiation Protocol (SIP) signaling. The real-time transfer protocol (RTP) media streams for the VoIP session travel between the WHs through the enterprise LAN infrastructure without leaving the enterprise. All signaling for the call is done within the enterprise's telecommunication infrastructure. The WLAN radio interfaces of both WH1 and WH2 are being utilized for this VoIP call, and the CN is not involved in the call at this point.

Some time later, WH1 begins to move out of WLAN radio coverage. When the WH1-AP link becomes sufficiently deteriorated, or some other suitable condition arises, the direct intra-enterprise voice connection is replaced by a new connection that is routed through the CN. This is done through use of a cellular access gateway of the CN which utilizes, for example, Generic Access Network (GAN) or Unlicensed Mobile Access (UMA) technologies, and may be or include a UMA Network Controller (UNC), GAN Controller (GANC), or the like. The event that triggers this call or connection replacement may be referred to as a connection replacement trigger (CRT) or, alternatively, a network anchoring handover condition. Thus, when a CRT is detected, the direct connection between WH1 and WH2 through the LAN is seamlessly replaced by a CN-routed connection. Specifically, when a CRT associated with WH1 is detected, WH1 initiates a new voice call to WH2 that is routed through the CN using the cellular access gateway of the CN. This is done while maintaining the current WH1-WH2 WLAN voice call. The new connection setup propagates through the CN and arrives as a new "silent" incoming VoIP call at WH2 through its WLAN radio interface. WH2 recognizes that the incoming call is from WH1 (e.g. via the contents of a SIP signaling INVITE) for purposes of the transition and silently accepts the call.

Once the new VoIP call is established, two parallel calls are in progress between WH1 and WH2 in the WLAN through their WLAN radio interfaces. The calls may then be conferenced in together or merged for a seamless connection transition, where the initial call/connection may be dropped. Note that this call/connection replacement is preferably transparent to the end users of WH1 and WH2. The call now has a single connection that is routed through the CN and controlled by the cellular access gateway of the CN (i.e. the UNC).

Note that RF traffic channel resources of the CN are still not being utilized for the call at this point; that is, the WLAN radio interfaces of WH1 and WH2 are being utilized for the call but the cellular radio interfaces of WH1 and WH2 are not being utilized for the call. Subsequently, if and when WH1 (or WH2) leaves WLAN coverage, the CN causes a radio handover to occur so that WH1 transitions from operating in the WLAN to operating in the cellular network using its cellular network interface.

Advantageously, as a large percentage of calls may be made between devices of the same enterprise, such calls will not incur the costs associated with the WAN. Only when complete VHO is likely or imminent will the call be replaced by one which flows through the CN. If the VHO occurs after the call has been replaced via the CN, then it is properly routed through the CN and will enjoy these VHO performance benefits. Note that, although the reverse procedure is possible when WH1 roams back within WLAN coverage, it is also reasonable that the call may be completed using the cellular connection.

At this time it is unclear what non-airtime costs would be charged by carriers for voice connections. Calls that do not use cellular RF channel resources may be charged at rates which are much less than normal cellular call rates. Similarly, WLAN-Carrier calls that are established and carried using packet-based signaling may be billed based on carrier traffic volume rather than by time. In these cases, the carrier-based connection path may be set up for a small incremental cost before the VHO is needed. This may be done by setting a higher enterprise-WLAN signal strength threshold than that used to trigger a normal VHO. When this threshold is exceeded, the WLAN-carrier connection is established. The cost of false triggering to a Carrier-WLAN connection would be much less than the cost of false triggering to a Carrier-cellular connection. It is also unclear at this time what latencies will exist for WLAN-Carrier call setup. It is possible that these times may be significantly shorter than conventional cellular setup latencies because the signaling path into the cellular core network is direct. If the connection involves only WLAN-Carrier call legs, external networks such as the PSTN will not be involved and this will lead to shorter call setup latencies.

The above description assumes that calls are made between WH's that are enabled with the appropriate improved techniques. When calls are made between such a handset (e.g. "WH1") and a legacy phone (e.g. VoIP, PBX or PSTN phone referred to as "P2"), however, the techniques may still be facilitated with use of suitable additional network equipment. This additional network equipment may be, for example, an IP-PBX or PSTN gateway with appropriate call control and switching, hereinafter referred to as "X". Specifically, the intra-enterprise call may be made through X, which is adapted to split the call into two call legs. The call would initially run from WH1 to X and from X to P2. The X-to-P2 call leg is permanent and does not change for the duration of the call. When WH1 issues a CRT, the WH1-to-X call leg is replaced by a call leg that travels from WH1 through the CN to X. This may be done in two ways which depends on how WH1 creates the call leg. In this case where WH1 dials a PSTN destination that resides on X, the call leg will travel through the CN and PSTN to X. In the case where WH1 dials a legacy destination that is external to the enterprise, the call connects to the PBX, and the PBX creates the external (fixed) leg to the legacy external device (either via IP or PSTN). When the new call leg reaches X, it connects the new call leg to the X-to-P2 call leg.

To help further illustrate, FIG. 1 is an illustrative representation of a communication system 100 which includes a wireless local area network (WLAN) 102 and a wireless wide area network (WWAN) 104. In the embodiment described, WLAN 102 is an IEEE 802.11-based WLAN and WWAN 104 is a cellular telecommunications network. WLAN 102 may be part of a communication network such as a local area network (LAN) 110. In this embodiment, LAN 110 is part of a private communication network which may be referred to as an enterprise network of an enterprise having a gateway 116 which may include a firewall. Communications between LAN 110 and WWAN 104 may be facilitated through a connecting network such as a broadband IP network such as the Internet 101.

Terminals may connect to LAN 110 through any suitable means, such as through a plurality of wireless access points (APs) (e.g. APs 112 and 114) of WLAN 102. Such mobile communication devices and wireless APs operate in accordance with well-known IEEE 802.11 standards. In this example, both communication devices 106 and 108 of LAN 110 which are shown are mobile communication devices/wireless handsets (WH) of the dual-mode type, having both WLAN and WWAN radio interfaces. In particular, communication device 106 is shown to have one or more processors 120, a WLAN radio interface 122, a WWAN radio interface 124, and an antenna means 125 and 126 coupled to radio interfaces 122 and 124. Similarly, communication device 108 is shown to have one or more processors 128, a WLAN radio interface 130, a WWAN radio interface 132, and an antenna means 133 and 134 coupled to radio interfaces 130 and 132.

LAN 110 which includes WLAN 102 provides various data and communication services to its terminals. For example, LAN 110 may provide for voice telephony communication services for its terminals with use of Voice over IP (VoIP) communications. For such services, LAN 110 may utilize servers such as a VoIP type server 118 or at least one session server which is a session initiation protocol (SIP) server. Today, communication applications, such VoIP applications, for terminals require the use of SIP. SIP is well-documented in standard documents such as Request For Comments (RFC) 3261.

WWAN 104 which may be the cellular telecommunications network includes a core WAN network 136, a plurality of base station controllers such as a base station controller (BSC) 138 coupled to core WAN network 136, and a plurality of base stations such as a base station (BS) 140 coupled to associated BSCs 138. Core WAN network 136, BSC 138, and BS 140 operate mostly in a conventional fashion. An IP Public Branch Exchange (IP PBX) controller or equipment 150 may be coupled to LAN 110 for interfacing with a Public Switched Telephone Network (PSTN) 144 to facilitate calls with other telephone equipment such as a landline telephone device 146. As will be described later below, IP PBX controller or equipment 150, which may be referred to more generally as a conferencing gateway or server, is one type of network component which may be utilized to facilitate techniques of the present disclosure.

A WWAN (e.g. cellular) access gateway 142 (or, more generally, call control equipment) is provided in order to facilitate communication switching operations (e.g. roaming, handovers) between WLAN 102 and WWAN 104. Preferably, WWAN access gateway 142 utilizes Generic Access Network (GAN) or Unlicensed Mobile Access (UMA) based technology and may be or include a UMA Network Controller (UNC) or the like. In this case, communication devices 106 and 108 are also enabled with GAN or UMA type capabilities.

Such GAN or UMA methodologies are known and described in publicly available documentation made available from, for example, the UMA technology organization. Describing traditional operation, communication device with GAN or UMA-enabled, dual-mode operation (e.g. communication device 106) is within operating range of WLAN 102 for communications. Upon connecting, communication device 106 contacts WWAN access gateway 142 (e.g. a UNC) over the Internet 101 to be authenticated and authorized to access voice and data services (e.g. GSM and GPRS services) via WLAN 102. If approved, the subscriber's current location information stored in core WAN 136 is updated and, from that point on, all voice and data traffic for communication device 106 is routed to the device via the Unlicensed Mobile Access Network (UMAN) (i.e. the WLAN 102) rather than the cellular radio access network (RAN). When communication device 106 moves outside the range of WLAN 102, communication device 106 and the UNC help facilitate roaming back to the licensed outdoor network (i.e. the WWAN 104). This "roaming" process may normally be completely transparent to the subscriber. When a call is established for communication device 106 while operating within WLAN 102, the call connection for the call is routed within WAN 136 but RF resources of WLAN 102 are utilized. This way, if communication device 106 moves outside the range of WLAN 102 during the call, the call is automatically handed-over from WLAN 102 to WWAN 104 with no discernable service interruption.

Figure 2:
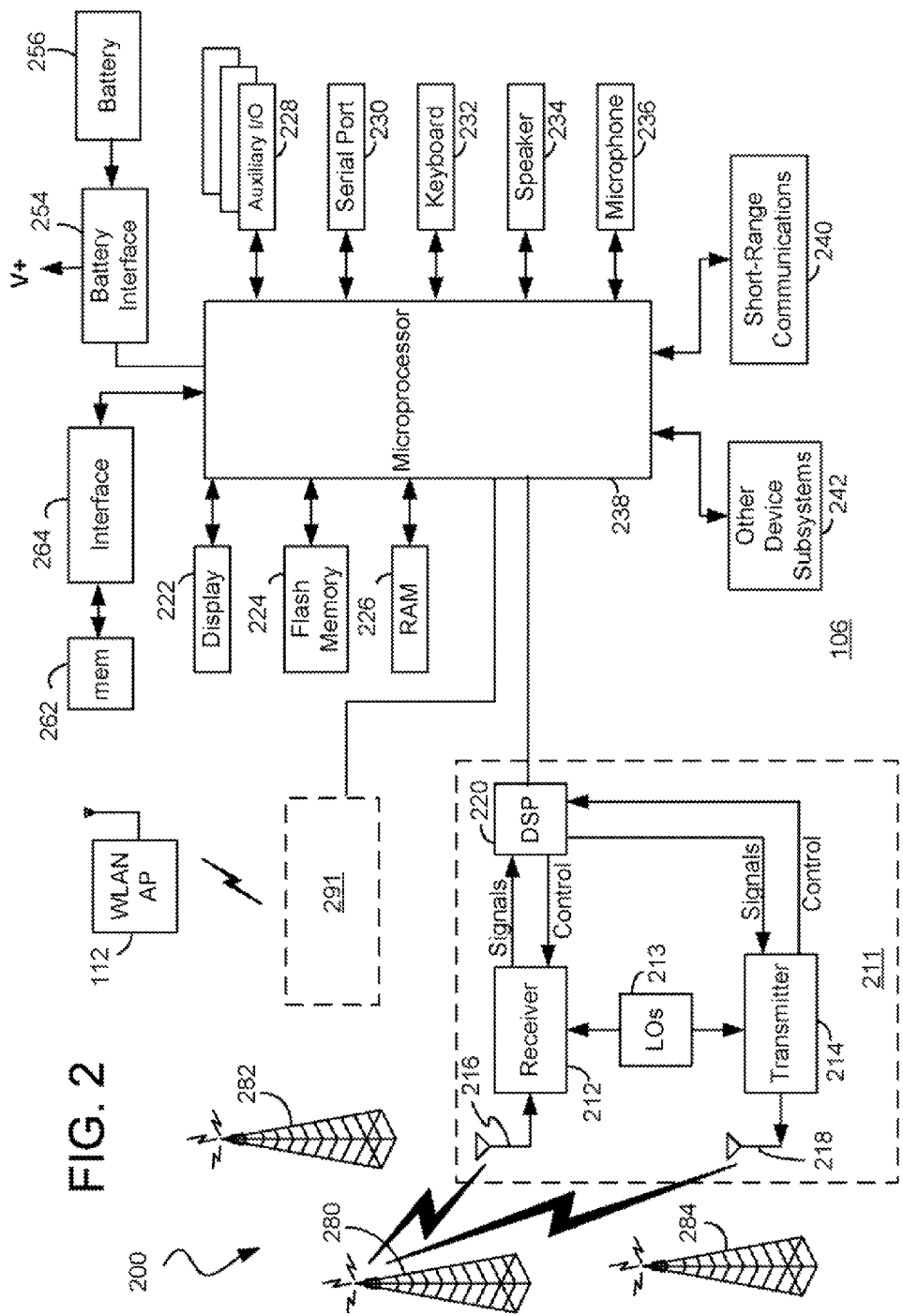
FIG. 2 is a schematic diagram of a mobile communication device (e.g. a wireless handset (WH)) which may operate in both the WLAN and the WWAN of FIG. 1.

Referring now to FIG. 2, electrical components of a typical mobile communication device 106 (e.g. a wireless handset, a mobile station) which operates in a wireless network environment which includes both WLANs (represented in FIG. 2 by AP 112) and WWANs (represented in FIG. 2 by cellular base stations 200 which include stations 280, 282, and 284) are now described. Mobile device 106 may be representative of one or more terminals which operate in communication system 100 of FIG. 1. Mobile device 106 is preferably a two-way communication device having at least voice and advanced data communication capabilities, including the capability to communicate with other computer systems. Depending on the functionality provided by mobile device 106, it may be referred to as a data messaging device, a two-way pager, a cellular telephone with data messaging capabilities, a wireless Internet appliance, or a data communication device (with or without telephony capabilities).

As shown in FIG. 2, mobile device 106 is adapted to wirelessly communicate with cellular base stations 200. For communication with cellular base stations 200, mobile device 106 utilizes a communication subsystem 211 which includes RF transceiver circuitry. Communication subsystem 211 includes a receiver 212, a transmitter 214, and associated components, such as one or more (preferably embedded or internal) antenna elements 216 and 218, local oscillators (LOs) 213, and a digital signal processor (DSP) 220. As will be apparent to those skilled in the field of communications, the specific design of communication subsystem 211 depends on the communication network in which mobile device 106 is intended to operate. In the present application, communication subsystem 211 (including its associated processor/processing components) are operative in accordance with a cellular or other suitable WWAN standards (i.e. a standard other than IEEE 802.11), such as GSM/GPRS standards.

Mobile device 106 may send and receive communication signals through the network after required network procedures have been completed. Signals received by antenna 216 through the network are input to receiver 212, which may perform such common receiver functions as signal amplification, frequency down conversion, filtering channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These processed signals are input to transmitter 214 for digital-to-analog (D/A) conversion, frequency up conversion, filtering, amplification and transmission through the network via antenna 218. DSP 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Mobile device 106 also has a communication subsystem 291 which includes RF transceiver circuitry operative in accordance with a suitable WLAN standard, such as the IEEE 802.11 standard, for communications with WLANs (e.g. represented by AP 112 in FIG. 2). Communication subsystem 291 is similar in structure and functionality to communication subsystem 211, where DSP 220 may be replaced with a processing module referred to as a baseband (BB) and media access control (MAC) module. Although mobile device 106 may have separate and independent subsystems for these purposes, at least some portions or components of these otherwise different subsystems may be shared where possible. As mobile device 106 operates in accordance with both a cellular network interface standard (e.g. GSM/GPRS standard) and the IEEE 802.11 standard, it may be referred to as a "dual mode" mobile device.

Since mobile device 106 may be a handheld, portable, battery-powered device, it also includes a battery interface 254 for receiving one or more rechargeable batteries 256. Such a battery 256 provides electrical power to most if not all electrical circuitry in mobile device 106, and battery interface 254 provides for a mechanical and electrical connection for it. Battery interface 254 is coupled to a regulator (not shown in FIG. 2) that provides a regulated voltage V+ to all of the circuitry.

Mobile device 106 includes a microprocessor 238 (one type of processor or controller) that controls overall operation of mobile device 106. This control includes the call transition techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 106. A predetermined set of applications that control basic device operations, including at least data and voice communication applications, will normally be installed on mobile device 106 during its manufacture. A preferred application that may be loaded onto mobile device 106 may be a personal information manager (PIM) application having the ability to organize and manage data items relating to user such as, but not limited to, e-mail, calendar events, voice mails, appointments, and task items. Naturally, one or more memory stores are available on mobile device 106, and memory 262 such as a subscriber identity module (SIM) or the like coupled via an interface 264 is used to facilitate storage of PIM data items and other user information.

The PIM application preferably has the ability to send and receive data items via the wireless network. In a preferred embodiment, PIN data items are seamlessly integrated, synchronized, and updated via the wireless network, with the wireless device user's corresponding data items stored and/or associated with a host computer system thereby creating a mirrored host computer on mobile device 106 with respect to such items. This is especially advantageous where the host computer system is the wireless device user's office computer system. Additional applications may also be loaded onto mobile device 106 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 106 and may provide enhanced on-device functions, communication-related functions, or both. For example, secure communication applications may enable electronic commerce functions and other such financial transactions to be performed using mobile device 106.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 106 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 106 is substantially similar, except that the received signals would be output to speaker 234 and signals for transmission would be generated by microphone 236. Alternative voice or audio I/O subsystems, such as a voice message recording subsystem, may also be implemented on mobile device 106. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 106 by providing for information or software downloads to mobile device 106 other than through a wireless communication network. The alternate download path may, for example, be used to load an encryption key onto mobile device 106 through a direct and thus reliable and trusted connection to thereby provide secure device communication. Short-range communications subsystem 240 of FIG. 2 is an additional optional component that provides for communication between mobile device 106 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile device 106 has just been described, any suitable mobile communication device or terminal may be part of the inventive methods and apparatus which will be described in fuller detail below.

As described earlier above in the Background section, the use of cellular network anchoring (CNA) requires that all intra-enterprise calls placed to/from mobile communication devices be routed through the cellular network (CN) when the call is made. This is required to establish the proper routing connections necessary in the event that a vertical handover should occur at some later time during the call. As apparent, placing intra-enterprise calls is expected to be more costly since enterprise users will be billed by the cellular operator even for calls which remain internal to the enterprise. Enterprise customers who have invested in a telecom infrastructure and WLAN infrastructure that they manage may be reluctant to pay a carrier to use their own network. In addition, if all calls are forced to go through the CN, it will not be possible to fully utilize the enhanced capabilities that are available in the enterprise infrastructure.

According to the present disclosure, two mobile communication devices or wireless handhelds (WHs) (e.g. WH1 and WH2) are initially operating within enterprise WLAN coverage and each are associated with an IEEE 802.11 access point (AP). When an intra-enterprise call is made between WH1 and WH2, the call is established and maintained directly between the two WHs through the LAN. The call may be a Voice over IP (VoIP) call utilizing Session Initiation Protocol (SIP) signaling. The real-time transfer protocol (RTP) media streams for the VoIP session travel between the WHs through the enterprise LAN infrastructure without leaving the enterprise. All signaling for the call is done within the enterprise's telecommunication infrastructure. The WLAN radio interfaces of both WH1 and WH2 are being utilized for this VoIP call, and the CN is not involved in the call at this point. Some time later, WH1 begins to move out of WLAN radio coverage. When the WH1-AP link becomes sufficiently deteriorated, the direct intra-enterprise voice connection is replaced by a new connection that is routed through the CN. This is done through use of a cellular access getaway of the CN which utilizes, for example, Generic Access Network (GAN) or Unlicensed Mobile Access (UMA) technology and may be or include a UMA Network Controller (UNC), for example. The event that triggers this call or connection replacement may be referred to as a connection replacement trigger (CRT) or, alternatively, a network anchoring handover condition. Thus, when a CRT is detected, the direct connection between WH1 and WH2 through the LAN is seamlessly replaced by a CN-routed connection. Specifically, when a CRT associated with WH1 is detected, WH1 initiates a new voice call to WH2 that is routed through the CN via the cellular access gateway of the CN. This is done while maintaining the current WH1-WH2 WLAN voice call. The new connection setup propagates through the CN and arrives as a new "silent" incoming VoIP call at WH2 through its WLAN radio interface. WH2 recognizes that the incoming call is from WH1 (e.g. via the contents of a SIP signaling INVITE) for purposes of the transition and silently accepts the call.

Once the new VoIP call is established, two parallel calls are in progress between WH1 and WH2 in the WLAN through their WLAN radio interfaces. The calls may then be conferenced in together or merged for a seamless connection transition, where the initial call/connection may be dropped. Note that this call/connection replacement is preferably transparent to the end users of WH1 and WH2. The call now has a single connection that is routed through the CN and controlled by the cellular access gateway of the CN (e.g. the UNC).

Note that RF traffic channel resources of the CN are still not being utilized for the call at this point; that is, the WLAN radio interfaces of WH1 and WH2 are being utilized for the call but the cellular radio interfaces of WH1 and WH2 are not being utilized for the call. Subsequently, if and when WH1 (or WH2) leaves WLAN coverage, the CN causes a radio handover to occur so that WH1 transitions from operating in the WLAN to operating in the cellular network using its cellular network interface.

Advantageously, as a large percentage of intra-enterprise calls may be maintained solely within the enterprise, such calls will not incur the costs associated with the WAN. Only when complete VHO is likely or imminent will the call be replaced via the CN, then it is properly routed through the CN and will enjoy these VHO performance benefits. Note that, although the reverse procedure is possible when WH1 roams back within WLAN coverage, it is also reasonable that the call may be completed using the cellular connection.

FIG. 3 is a flowchart which describes a method of switching communication operations between WLANs and WWANs for calls such as voice calls (e.g. VoIP calls) between communication devices. As apparent, the embodiments of the present disclosure are directed to a specific example where the WLAN is an IEEE 802.11-based network and the WWAN is a cellular telecommunications network. However, the WLAN and WWAN may be networks different from those networks, as long as the specific WLAN network covers a smaller region relative to the specific WWAN network. Specifically, for example, one of the networks may be a Bluetooth-based network, and the other network may be a cellular network or an IEEE 802.11-based network. Also, for example, one of the networks may be a WiMAX network, and the other network may be a cellular network or an IEEE 802.11-based network.

Figure 6:
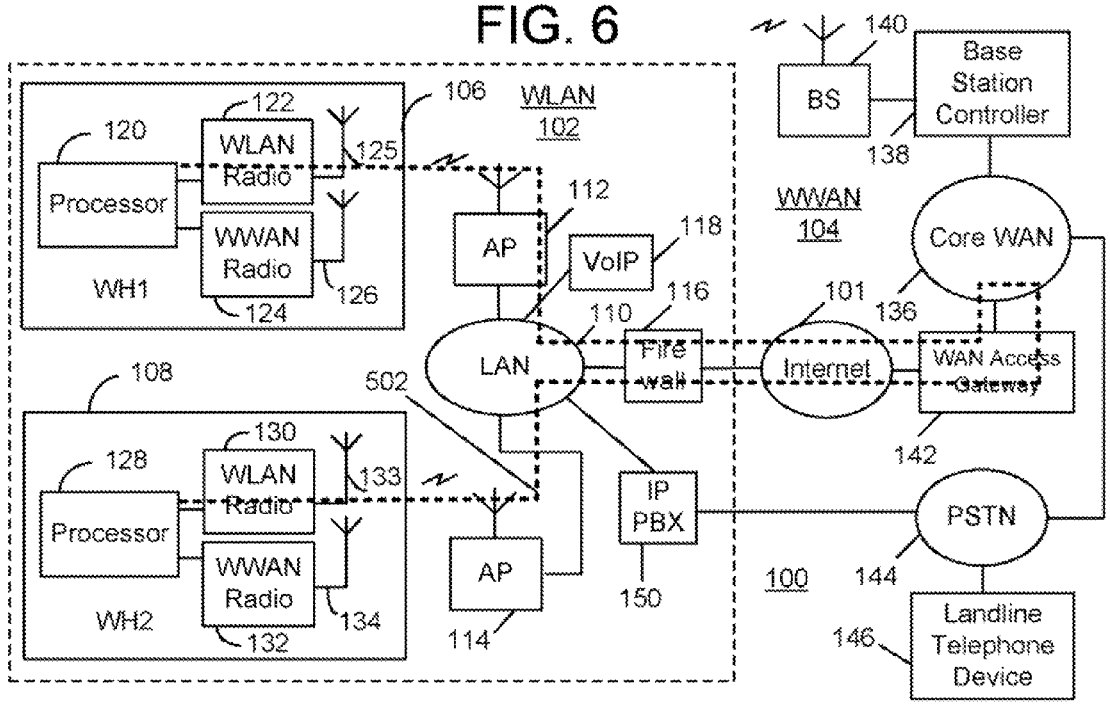
Figure 7:
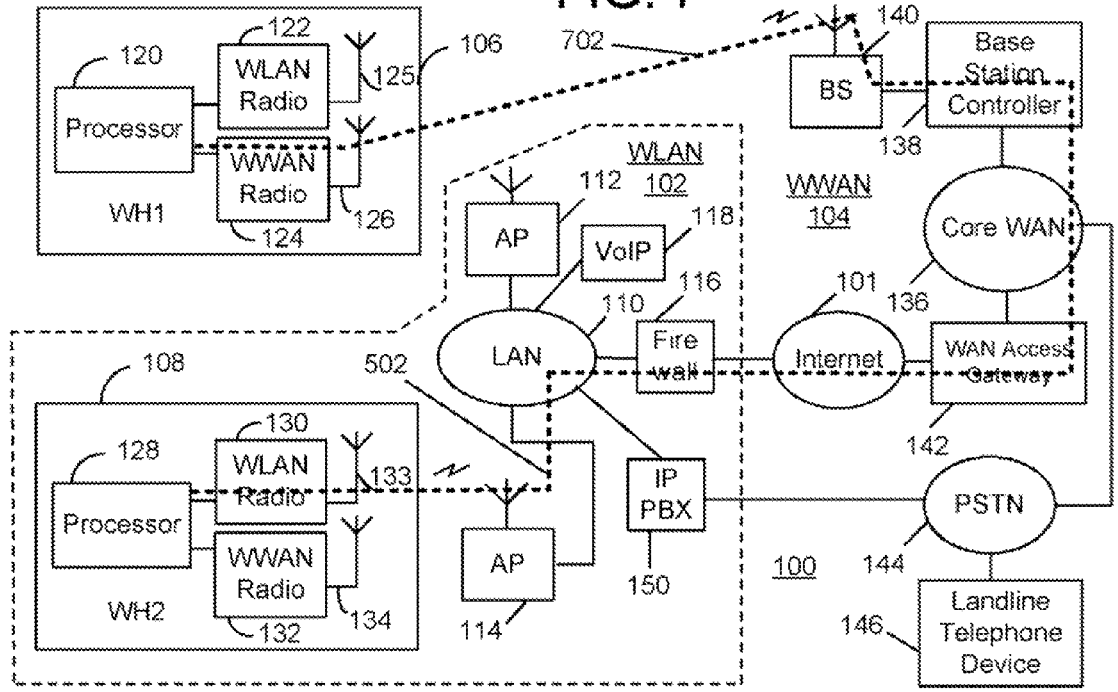

The flowchart of FIG. 3 will be described in combination with the system diagrams presented in sequential order in FIGS. 4-7 with respect to the flowchart of FIG. 3. Prior to discussing the flowchart of FIG. 3 in detail, a brief overview of FIGS. 4-7 is provided. The example shown in FIGS. 4-7 assumes that both communication devices are mobile communication devices of the dual-mode type, having both WLAN and WWAN radio interfaces, although only one communication devices need be such a dual-mode device. Briefly, in FIG. 4 an initial call between communication devices 106 and 108 connected in LAN 110 has a call connection 402 that is routed in and not outside of LAN 110 (i.e. not through WAN 136). In this example, communication devices 106 and 108 are connected in LAN 110 via WLAN 102 using their WLAN radio interfaces 122 and 130, respectively. In FIG. 5, a call anchor transition condition is detected which triggers a subsequent parallel call to be established between communication devices 106 and 108 connected in LAN 110 with a call connection 502 that is routed through WAN 136 through WWAN access gateway 142 (e.g. a UNC). Communication devices 106 and 108 still utilize their WLAN radio interfaces 122 and 130, respectively, to maintain both calls. In FIG. 6, the subsequent call is conferenced or merged with the initial call and the initial call is dropped. In FIG. 7, a radio handover condition is detected which triggers a radio handover of RF resources of WLAN 102 to RF resources of WWAN 104 for communication device 106. Thereafter, communication device 106 utilizes its WWAN radio interface 124 with WWAN 104 in lieu of its WLAN radio interface 122.

The method will now be described in more detail in relation to the flowchart of FIG. 3 in combination with FIGS. 4-7. Note that the method of FIG. 3 may be performed by the communication device, and/or appropriate network components, and/or be embodied in a computer program product which includes a computer readable medium (e.g. memory) and computer instructions stored in the computer readable medium which are executable by one or more processors (i.e. communication device or network component or server).

Beginning at a start block 302 of FIG. 3, a call connection for a call (e.g. VoIP call) is established between a first communication device and a second communication device which are connected in the LAN (step 304 of FIG. 3). See FIG. 4. The call connection of the call is routed through the LAN but not routed through the WAN. In this example, both communication devices are mobile communication devices of the dual-mode type and utilize their WLAN radio interfaces with the WLAN for communication.

The decision to make the intra-enterprise call routing for the call may be made by a network component or the communication device that initiates the call, for example, having knowledge of whether or not the call will be an intra-enterprise or other suitable type call. This is generally performed by identifying whether both the first and the second communication devices are connected in the LAN, and causing the call connection of the call to be established and maintained through the LAN without being routed through the WAN in response to identifying that both the first and the second communication devices are connected in the LAN; otherwise, if one of the devices are not connected in the LAN, then the call connection is routed through the WAN. For example, upon receipt or indication of a call request for establishing a call, a network component may refer to a stored list of identifiers of communication devices that are connected in the LAN and compare an identifier of the intended called party of the initial call request with the stored list of identifiers. If there is a match between the identifier and one of the identifiers in the stored list, then the call connection is maintained solely within the LAN, but otherwise the call connection is routed through the WAN. Note, however, that the call may be initially routed through the WAN via the WAN access gateway when both communication devices are connected in the LAN if a call anchor transition condition exists for one of the communication devices at the time of the call request.

After the call is established, it is continually monitored whether a call anchor transition condition exists (step 306 of FIG. 3). In general, a call anchor transition condition is a condition of a communication device where it is more likely that a radio handover from WLAN to WWAN will be necessary. The call anchor transition condition may be, for example, a condition where a WLAN radio signal strength for one of the communication devices falls below a (first) predetermined threshold; a condition where a (first) trigger mechanism from an AP tripwire in the WLAN for one of the communication devices is detected; or a condition where a user input is received from one of the communication devices which indicates a desire to change to the WWAN, as a few examples. This information may be made known at the communication device which may control the process accordingly. Note that the call anchor transition condition monitored in step 306 may never occur during the life of the call.

In response to identifying a call anchor transition condition identified at step 306, however, a call connection for another call is established between the first communication device and the second communication device (step 308 of FIG. 3). See FIG. 5. This new call is established while the initial call connection is also being maintained. Notably, the call connection for this new call is routed through the WAN via the WWAN access gateway (e.g. the UNC) of the WAN. The call or call connection may now be said to be anchored in the WAN. Note that the WLAN radio interfaces of the first and the second communication devices are still being utilized, now for both calls. As apparent, the call anchor transition may occur without any (vertical) radio handover of the radio channel between the WLAN and the WAN. Preferably, the communication device that detects or otherwise identifies the call anchor transition condition may be the device that initiates this new call, making the decision that the call should indeed be an external call through the WAN. Subsequently, both connections/calls may subsequently be conferenced in or merged together to provide a seamless connection transition for the communications, followed by the dropping of the initial call/connection. Thus, the subsequent call connection of the subsequent call replaces the initial call connection of the initial call. See FIG. 6. These techniques are performed at each communication device involved in the call.

Note that the initial call made in relation to step 304 of FIG. 3 may be initially routed through the WAN via the WAN access gateway, if the call anchor transition condition exists upon initiation of the call. In this case, the call connection for the initial call is established through the WAN via the WAN access gateway and the technique resumes at step 312 of FIG. 3.

Next, it is continually monitored whether a (vertical) radio handover condition exists (step 312 of FIG. 3). The (vertical) radio handover condition may be, for example, a condition where a WLAN radio signal strength for one of the communication devices falls below a (second) predetermined threshold; a condition where a (second) trigger mechanism from an AP tripwire in the WLAN for one of the communication devices is detected, as a few examples. Note that the radio handover condition monitored in step 312 may never occur during the life of the call.

In response to identifying a radio handover condition at step 312, however, a radio handover occurs for the communication device such that the communication device switches from utilizing the WLAN radio interface with the WLAN to a WWAN radio interface with the WWAN (step 314 of FIG. 3). See FIG. 7. A WWAN radio connection portion 702 between communication device 106 and WWAN 104 replaces the previously existing WLAN radio connection portion between communication device 106 and WLAN 102. The WLAN radio interface of the communication device is no longer being utilized and may be placed in a low power mode or powered down.

FIGS. 8-11 are illustrations of communication system 100 presented in a sequence according to the flowchart of FIG. 3, in a variation of the present invention where communication device 108 is a legacy device having conventional operation. In this example, communication device 108 is a conventional WLAN mobile communication device having no WWAN/cellular radio capabilities.

In FIG. 8, an initial call (e.g. VoIP call) between the communication devices 106 and 108 connected in LAN 110 has a call connection that is routed through but not outside LAN 110 (i.e. not through the WAN) via IP PBX 150 of LAN 110. The call connection illustrated in FIG. 8 has two call connection portions, specifically, a call connection portion 802a from communication device 106 to IP PBX 150 and a call connection portion 802b from IP PBX 150 to communication device 108. Both WLAN radio interfaces 122 and 130 are being utilized by the communication devices 106 and 108 at this point.

The decision to make the intra-enterprise call routing for the call may be made by the network component (e.g. IP PBX 150) or the communication device that initiates the call, for example, having knowledge of whether or not the call will be an intra-enterprise or other suitable type call. This is generally performed by identifying whether both communication devices 106 and 108 are connected in LAN 110, and causing the call connection of the call to be established and maintained through LAN 110 without being routed through WAN 136 in response to identifying that both communication devices 106 and 108 are connected in LAN 110; otherwise, if one of the devices 106 and 108 are not connected in LAN 110, then the call connection is routed through WAN 136.

In one particular embodiment, upon receipt or indication of a call request for establishing a call, the network component (e.g. IP PBX 150) may refer to a stored list of identifiers of communication devices that are connected in LAN 110 and compare an identifier of the intended called party of the initial call request with the stored list of identifiers. If there is a match between the identifier and one of the identifiers in the stored list, then the call connection is maintained within LAN 110 as described in relation to FIG. 8; otherwise the call connection is routed through WAN 136. Note, however, that the call may be initially routed through WAN 136 via WAN access gateway 142 when both communication devices 106 and 108 are connected in LAN 110 if a call anchor transition condition exists for at least one of communication devices 106 and 108 at the time of the call request.

In FIG. 9, a call anchor transition condition is detected which triggers a subsequent call to be established between communication device 106 and IP PBX 150 for communication device 108. This new call is established while the initial call connection is also being maintained. Notably, the call connection for this new call is routed through WAN 136 via WWAN access gateway 142 (e.g. the UNC). The call or call connection may now be said to be anchored in the WAN. The WLAN radio interfaces of the first and the second communication devices are still being utilized, now for both calls. As apparent, the call anchor transition may occur without any (vertical) radio handover of the radio channel between the WLAN and the WAN.

Preferably, the network component or the communication device that detects or otherwise identifies the call anchor transition condition is the device that initiates this new call, making the decision that the call should indeed be an external call through WAN 136. In general, a call anchor transition condition is a condition of a communication device where it is more likely that a radio handover from WLAN to WWAN will be necessary (examples of which were provided earlier above). Note, however, that this call anchor transition condition may never occur during the life of the call.

Figure 10:
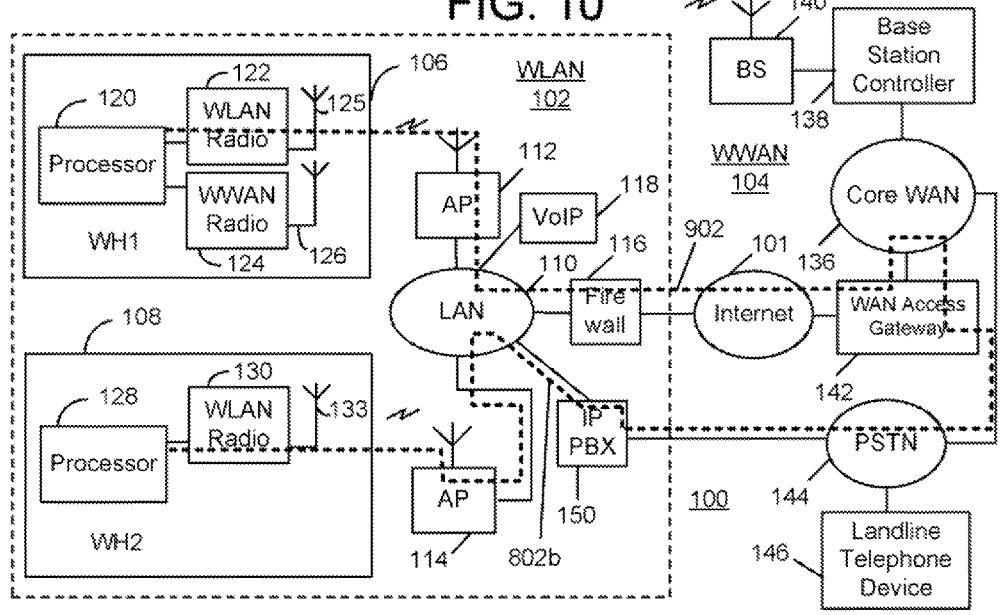

In FIG. 10, it is shown that call connection 902 of the subsequent call is conferenced in or merged with call connection portion 802b of the initial call at IP PBX 150. This provides a seamless connection transition for the communications between communication devices 106 and 108. The call connection portion 802a (FIG. 8) of the initial call may be dropped as shown in FIG. 10.

Figure 11:
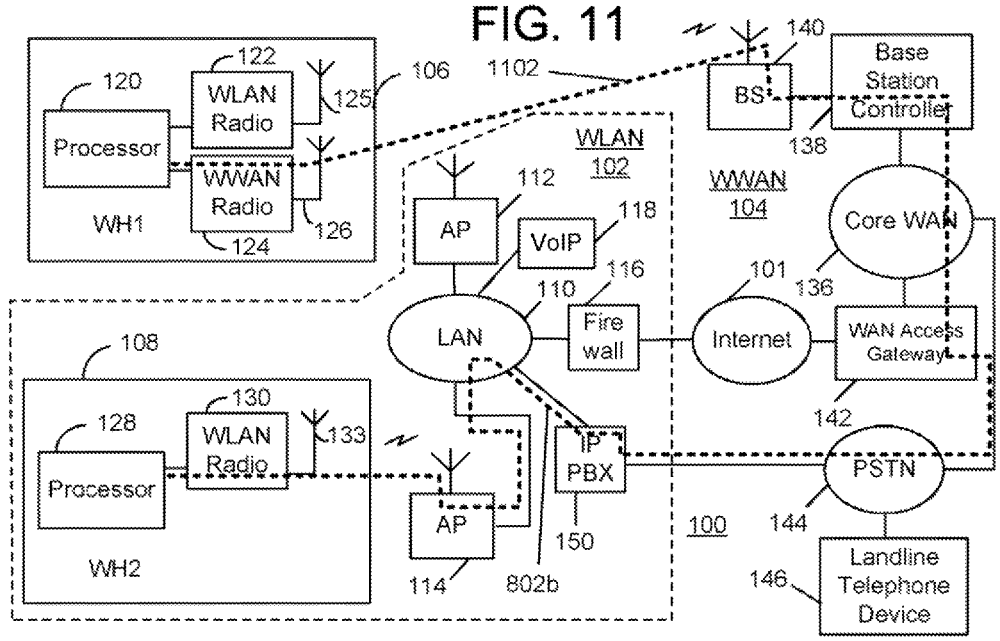

In FIG. 11, a radio handover condition is detected which triggers a radio handover of RF resources of WLAN 102 to RF resources of WWAN 104 for communication device 106. Thus, a WWAN radio connection portion 1102 between communication device 106 and WWAN 104 replaces the previously existing WLAN radio connection portion between communication device 106 and WLAN 102 for the call. This is done when the signal strength between communication device 106 and WLAN 102 falls below a predetermined threshold, or for some other suitable reason. Note, however, that the radio handover condition may never occur during the life of the call.

Advantageously, as the vast majority of intra-enterprise calls will be established solely within the enterprise WLAN, such calls will not incur the carrier network charges. Only when complete vertical handover is likely or imminent will the call be replaced by one which flows through the carrier's network. If the vertical handover occurs after the call has been replaced by one through the carrier's network, then it is properly routed through the carrier's network and will enjoy improved performance benefits.

Thus, methods and apparatus for use in switching communication operations between a wireless local area network (WLAN) of a LAN and a wireless wide area network (WWAN) of a WAN have been described. A first call connection of a first call for communications is established between a first communication device and a second communication device which are both connected in the LAN. The first call connection is maintained within the LAN without being routed through the WAN. In response to a call anchor transition condition, a second call connection of a second call for continuing the communications is established between the first and the second communication devices which are both connected in the LAN. The second call connection is routed through the WAN via a WAN access gateway. The second call connection of the second call may subsequently replace the first call connection of the first call for continuing the communications. The call anchor transition condition may be, for example, a condition where a signal strength between the WLAN and the first communication device having a WLAN radio interface falls below a predetermined threshold.

Note that the second call connection is established without causing a radio handover between the WLAN and the WWAN to occur. In response to identifying a subsequent radio handover condition, however, a radio handover is performed for the first communication device such that the first communication device switches from utilizing a WLAN radio interface for the communications with the WLAN to a WWAN radio interface for the communications with the WWAN.

The WWAN access gateway may be an Unlicensed Network Access (UNA) controller (UNC) or a Generic Access Network (GAN) Controller (GANC). The WLAN and WWAN may be heterogeneous networks such as Bluetooth-based networks. IEEE 802.11-based networks, WiMAX networks, and cellular telecommunications networks. In one preferred embodiment, the WLAN is an IEEE 802.11-based network and the WWAN is a cellular telecommunication network. The second communication device may be one of a VoIP, PBX or PSTN communication device which operates to refrain from utilizing any WLAN radio interface for communications with the WLAN.

The technique may be embodied in a computer program product which includes a computer readable medium and computer instructions stored in the computer readable medium which execute the method. The technique may also be embodied in a mobile communication device having one or more processors, a WLAN radio interface adapted to communicate via the WLAN, and a WWAN radio interface adapted to communicate via the WWAN.

A network component (such as a conferencing gateway or server, such as an IP PBX) of the present disclosure is adapted to switch communication operations between a wireless local area network (WLAN) of a LAN and a wireless wide area network (WWAN) of a WAN, the network component includes one or more processors which are adapted to cause a first call connection of a first call for communications to be established between a first communication device and a second communication device which are both connected in the LAN. The first call connection is maintained within the LAN through the network component without being routed through the WAN. The one or more processors are further adapted to cause a second call connection of a second call for continuing the communications to be established between the first and the second communication devices which are both connected in the LAN in response to identifying a call anchor transition condition. The second call connection being routed from the network component through the WAN via a WAN access gateway.

The above-described embodiments of the present application are intended to be examples only. The embodiments of the present disclosure were directed to the specific example where the WLAN was an IEEE 802.11-based network and the WWAN was a cellular telecommunications network. However, the WLAN and WWAN may be networks different from those networks, as long as the WLAN type network covers a smaller region relative to the WWAN type network. Specifically, for example, one of the networks may be a Bluetooth-based network, and the other network may be a cellular network or an IEEE 802.11-based network. Also, for example, one of the networks may be a WiMAX network, and the other network may be a cellular network or an IEEE 802.11-based network. Those of skill in the art may effect alterations, modifications and variations to the particular embodiments without departing from the scope of the application. The invention described herein in the recited claims intends to cover and embrace all suitable changes in technology.

What is claimed is:

1. A method for use in switching communication operations between a wireless local area network (WLAN) of a LAN and a wireless wide area network (WWAN) of a WAN which utilizes a Generic Access Network (GAN) or Unlicensed Mobile Access (UMA) controller, the method comprising:

causing a first call connection of a first call for communications to be established and maintained between a first communication device and a second communication device which are both connected in the LAN, the first call connection being maintained via a WLAN interface of the first communication device and contained within the LAN without being routed to the WAN via the GAN or UMA controller, wherein the WLAN and WWAN comprise networks selected from a list comprising: a Bluetooth-based network, an IEEE 802.11-based network, a WiMAX network, and a cellular telecommunications network; and in response to identifying a predetermined condition: causing a second call connection of a second call for continuing the communications to be established and maintained between the first and the second communication devices which remain connected in the LAN, the second call connection being maintained via the WLAN interface of the first communication device and routed through the LAN out to the WAN via the GAN or UMA controller.

2. The method of claim 1, further comprising:
causing the second call connection of the second call to replace the first call connection of the first call for continuing the communications.

3. The method of claim 1, further comprising:
in response to identifying a radio handover condition: causing a radio handover to occur for the first communication device such that the first communication device switches from utilizing the WLAN interface for the communications with the WLAN to a WWAN interface for the communications with the WWAN.

4. The method of claim 1, wherein the second call connection of the second call is established and maintained without a radio handover occurring between the WLAN and the WWAN.

5. The method of claim 1, wherein the predetermined condition comprises a condition where a signal strength between the WLAN and the first communication device falls below a predetermined threshold.

6. The method of claim 1, further comprising:
identifying that both the first and the second communication devices are connected in the LAN; and
causing the first call connection of the first call to be established and contained within the LAN without being routed to the WAN via the GAN or UMA controller based on identifying that both the first and the second communication devices are connected in the LAN.

7. The method of claim 1, wherein the GAN or UMA controller comprises a UMA Network Controller (UNC).

8. The method of claim 1, wherein the GAN or UMA controller comprises a GAN Controller (GANC).

9. The method of claim 1, wherein the WLAN comprises an IEEE 802.11-based network and the WWAN comprises a cellular telecommunication network.

10. The method of claim 1, wherein the second Communication device comprises one of a voice over internet protocol (VoIP), a public branch exchange (PBX) or a public switched telephone network (PSTN) communication device having no WLAN radio interface for communications with the WLAN.

11. The method of claim 1, which is embodied as a computer program product comprising a computer readable memory and computer instructions stored in the computer readable memory which execute the method.

12. A mobile communication device configured to switch communication operations between a wireless local area network (WLAN) of a LAN and a wireless wide area network (WWAN) of a WAN which includes a Generic Access Network (GAN) or Unlicensed Mobile Access (UMA) controller, the mobile communication device comprising:
one or more processors;
a WLAN radio interface configured to communicate via the WLAN;
a WWAN radio interface configured to communicate via the WWAN, wherein the WLAN and WWAN comprise networks selected from a list comprising: a Bluetooth-based network, an IEEE 802.11-based network, a WiMAX network, and a cellular telecommunications network;
the one or more processors being configured to cause a first call connection of a first call for communications to be established and maintained, via the WLAN using the WLAN radio interface, with a communication device connected in the LAN, the first call connection being contained within the LAN without being routed to the WAN via the GAN or UMA controller; and
the one or more processors being configured to cause a second call connection of a second call for continuing the communications to be established and maintained, via the WLAN using the WLAN radio interface, with the communication device connected in the LAN in response to detecting a predetermined condition, the second call connection being routed through the LAN out to the WAN via the GAN or UMA controller.

13. The mobile communication device of claim 12, wherein the one or more processors are further configured to cause the second call connection of the second call to replace the first call connection of the first call for continuing the communications.

14. The mobile communication device of claim 12, wherein the one or more processors are further configured to, in response to identifying a radio handover condition, cause a radio handover to occur such that the mobile communication device switches from utilizing the WLAN radio interface for the communications with the WLAN to the WWAN radio interface for the communications with the WWAN.

15. The mobile communication device of claim 12, wherein the one or more processors are further configured to cause the second call connection of the second call to replace the first call connection of the first call for continuing the communications and, in response to identifying a radio handover condition, cause a radio handover to occur such that the mobile communication device switches from utilizing the WLAN radio interface for the communications with the WLAN to the WWAN radio interface for the communications with the WWAN.

16. The mobile communication device of claim 12, wherein the predetermined condition comprises a condition where a signal strength with the WLAN falls below a predetermined threshold.

17. The mobile communication device of claim 12, wherein the one or more processors are further configured to identify that both the first and the second communication devices are connected in the LAN and to cause the first call connection of the first call to be contained within the LAN without being routed to the WAN via the GAN or UMA controller based on the identifying.

18. The mobile communication device of claim 12, wherein the GAN or UMA controller comprises a UMA Network Controller (UNC).

19. The mobile communication device of claim 12, wherein the GAN or UMA controller comprises a GAN Controller (GANC).

20. The mobile communication device of claim 12, wherein the WLAN comprises an IEEE 802.11-based network and the WWAN comprises a cellular telecommunication network.

21. A network component configured to switch communication operations between a wireless local area network (WLAN) of a LAN and a wireless wide area network (WWAN) of a WAN which utilizes a Generic Access Network (GAN) or Unlicensed Mobile Access (UMA) controller, the network component comprising:
one or more processors;
the one or more processors being configured to cause a first call connection of a first call for communications to be established and maintained between a first communication device and a second communication device which are both connected in the LAN, the first call connection being maintained via a WLAN interface of the first communication device and contained within the LAN without being routed to the WAN via the GAN or UMA controller, wherein the WLAN and WWAN comprise networks selected from a list comprising: a Bluetooth-based network, an IEEE 802.11-based network, a WiMAX network, and a cellular telecommunications network; and
the one or more processors being configured to cause a second call connection of a second call for continuing the communications to be established and maintained between the first and the second communication devices which remain connected in the LAN in response to identifying a predetermined condition, the second call connection being maintained via the WLAN interface of the first communication device and routed through the LAN out to the WAN via the GAN or UMA controller.

22. The network component of claim 21, wherein the one or more processors are further configured to cause the second call connection of the second call to replace the first call connection of the first call for continuing the communications.

23. The network component of claim 21, wherein the one or more processors are further configured to cause a radio handover to occur for the first communication device, such that the first communication device switches from utilizing the WLAN interface for the communications with the WLAN to a WWAN radio interface for the communications with the WWAN, in response to identifying a radio handover condition.

24. The network component of claim 21, wherein the second call connection of the second call is established and maintained without a radio handover occurring between the WLAN and the WWAN for the first communication device.

25. The network component of claim 21, wherein the predetermined condition comprises a condition where a signal strength between the WLAN and the first communication device having a WLAN radio interface falls below a predetermined threshold.

26. The network component of claim 21, wherein the one or more processors are further operative to identify whether both the first and the second communication devices are connected in the LAN and to cause the first call connection of the first call to be contained within the LAN without being routed to the WAN via the GAN or UMA controller based on identifying that both the first and the second communication devices are connected in the LAN.

27. The network component of claim 21, wherein the GAN or UMA controller comprises a UMA Network Controller (UNC).

28. The network component of claim 21, wherein the GAN or UMA controller comprises a GAN Controller (GANC).

29. The network component of claim 21, further comprising an internet protocol public branch exchange (IP PBX) of the LAN.

30. The network component of claim 21, wherein the second communication device comprises one of a voice over internet protocol (VoIP), a public branch exchange (PBX) or a public switched telephone network (PSTN) communication device having no WLAN radio interface for communications with the WLAN.

* * * * *